(12) United States Patent
Sanders

(10) Patent No.: US 7,716,846 B2
(45) Date of Patent: May 18, 2010

(54) BEARING ALIGNMENT TOOL AND METHOD OF USE

(75) Inventor: Grover J. Sanders, Muskogee, OK (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 0 days.

(21) Appl. No.: 12/422,333

(22) Filed: Apr. 13, 2009

(65) Prior Publication Data

US 2009/0265947 A1 Oct. 29, 2009

Related U.S. Application Data

(60) Provisional application No. 61/125,184, filed on Apr. 23, 2008.

(51) Int. Cl.
G01B 5/14 (2006.01)
G01D 21/00 (2006.01)
(52) U.S. Cl. ......................................... 33/517; 33/645
(58) Field of Classification Search .................. 33/517, 33/613, 645, 549
See application file for complete search history.

(56) References Cited

U.S. PATENT DOCUMENTS

| | | | |
|---|---|---|---|
| 5,416,964 A * | 5/1995 | Thomas ........................ 29/271 |
| 6,688,774 B2 | 2/2004 | Kullin et al. ................. 384/539 |
| 7,263,765 B1 * | 9/2007 | Smith et al. .................... 29/724 |
| 7,540,086 B2 * | 6/2009 | Brueckert et al. ......... 29/898.07 |
| 2007/0222158 A1 * | 9/2007 | Roddis ........................ 277/345 |
| 2008/0219612 A1 * | 9/2008 | Smith et al. ................. 384/624 |

\* cited by examiner

Primary Examiner—Yaritza Guadalupe-McCall
(74) Attorney, Agent, or Firm—Laura L. Bozek

(57) ABSTRACT

A bearing alignment tool and method of use is provided for aligning inner and outer races of a roller bearing of the class wherein the inner and outer races of the roller bearing are axially displaceable with respect to each other in order to accommodate thermal growth of a rotating shaft. A bearing replacement procedure includes: (a) affixing the roller bearing to the shaft at its inner race; (b) disposing the shaft in a housing; (c) aligning the inner and outer races of the roller bearing with respect to each other and the housing in a predetermined spatial relationship by affixing an alignment tool to the housing, wherein the alignment tool has (i) an outer aligning surface which engages the outer race of the roller bearing; and (ii) an inner aligning surface which engages the inner race of the roller bearing; (d) removing the alignment tool from the housing; and (e) securing the housing to a fixed position on a support while maintaining the predetermined spatial relationship established in step (c). The method and alignment tool are particularly useful for quickly replacing bearings on an afterdryer of a papermachine where precision alignment and downtime are significant considerations.

20 Claims, 9 Drawing Sheets

BEARING ALIGNMENT TOOL AND METHOD OF USE

CLAIM FOR PRIORITY

This application is based upon U.S. Provisional Patent Application Ser. No. 61/125,184 of the same title, filed Apr. 23, 2008, the priority of which is hereby claimed and the disclosure of which is incorporated into this application by reference.

TECHNICAL FIELD

The present invention relates to a bearing alignment tool and method of using the tool. The bearing alignment tool is particularly useful for aligning bearings used on the shafts of afterdryers in a papermaking production line, where thermal growth of the shafts as the dryers heat up requires precision alignment of roller bearings.

BACKGROUND

Advances in machine technology have made it possible to run heated drying equipment in papermaking operations faster than ever before. Unfortunately, the same increased speeds often contribute to higher vibration levels which can cause shaft and bearing damage and jeopardize quality of the product unless suitable bearing and/or bearing/housing assemblies are used. Preferred assemblies are those which can accommodate thermal growth of the shaft as the dryers heat up. In the past, rocker housings for mounting the bearings were used. These housings were designed to move with the shaft to accommodate thermal expansion. However, the increased running speeds of current technology result in vibration levels so high that they can cause wear on the rockers; in some cases causing failure. So also, rocker housings tend to leak oil, especially at high speeds. More recently, toroidal roller bearings are a popular choice. These bearings can accommodate thermal shaft growth in the afterdryer as well as accommodate higher speeds. While toroidal bearings are somewhat self-aligning in lateral directions and resistant to failure due to angular misalignment because of their particular geometry, such bearings must be installed with precision in order to operate properly. A total misalignment of less than 5 degrees is recommended. In the past, alignment was accomplished manually with gauges, straight edges, and so forth by trial and error, after the bearing housing was fixed in position. A single bearing alignment thus required hours of maintenance time, causing large economic losses due to machine downtime in addition to the out of pocket labor expense.

SUMMARY OF INVENTION

The present invention relates to a bearing alignment tool for aligning the inner race of a roller bearing and the outer race of a roller bearing with respect to each other and a housing. Suitable roller bearings include toroidal roller bearings because of their particular utility in difficult operating environments as are seen in papermaking operations. Generally speaking, toroidal bearings are single roll bearings with long, slightly crowned symmetrical rollers. The raceways of both the inner and outer rings are concave and situated symmetrically about the bearing center. The attained combination of raceway profiles provides a favorable load distribution in the bearing as well as low frictional runnings. The rollers are self guiding, that is, they will adopt the position where the load is evenly distributed over the roller length, irrespective of whether the inner ring is slightly axially displaced and/or angularly misaligned with respect to the outer ring. Suitable bearings are available from SKF and are marketed as CARB® roller bearings. See also U.S. Pat. No. 6,688,774 to Kullin et al. for a description of toroidal roller bearings, the disclosure of which is incorporated herein by reference.

BRIEF DESCRIPTION OF DRAWINGS

The invention is described in detail below with reference to the drawings wherein like numerals designate similar parts and wherein.

DETAILED DESCRIPTION

The invention is described in detail below with reference to a particular construction for purposes of exemplification and illustration only. Modifications to particular features within the spirit and scope of the present invention, set forth in the appended claims, will be readily apparent to one of skill in the art.

Unless more specifically defined below, terminology as used herein is given its ordinary meaning. For example, "mils" refers to thousandths of an inch, "monolithic" refers to a single piece construction and so forth.

"Total misalignment" refers to angular misalignment between the outer and inner races of a roller bearing, measured at 4 locations around the bearing profile unless otherwise indicated.

Figure 1:
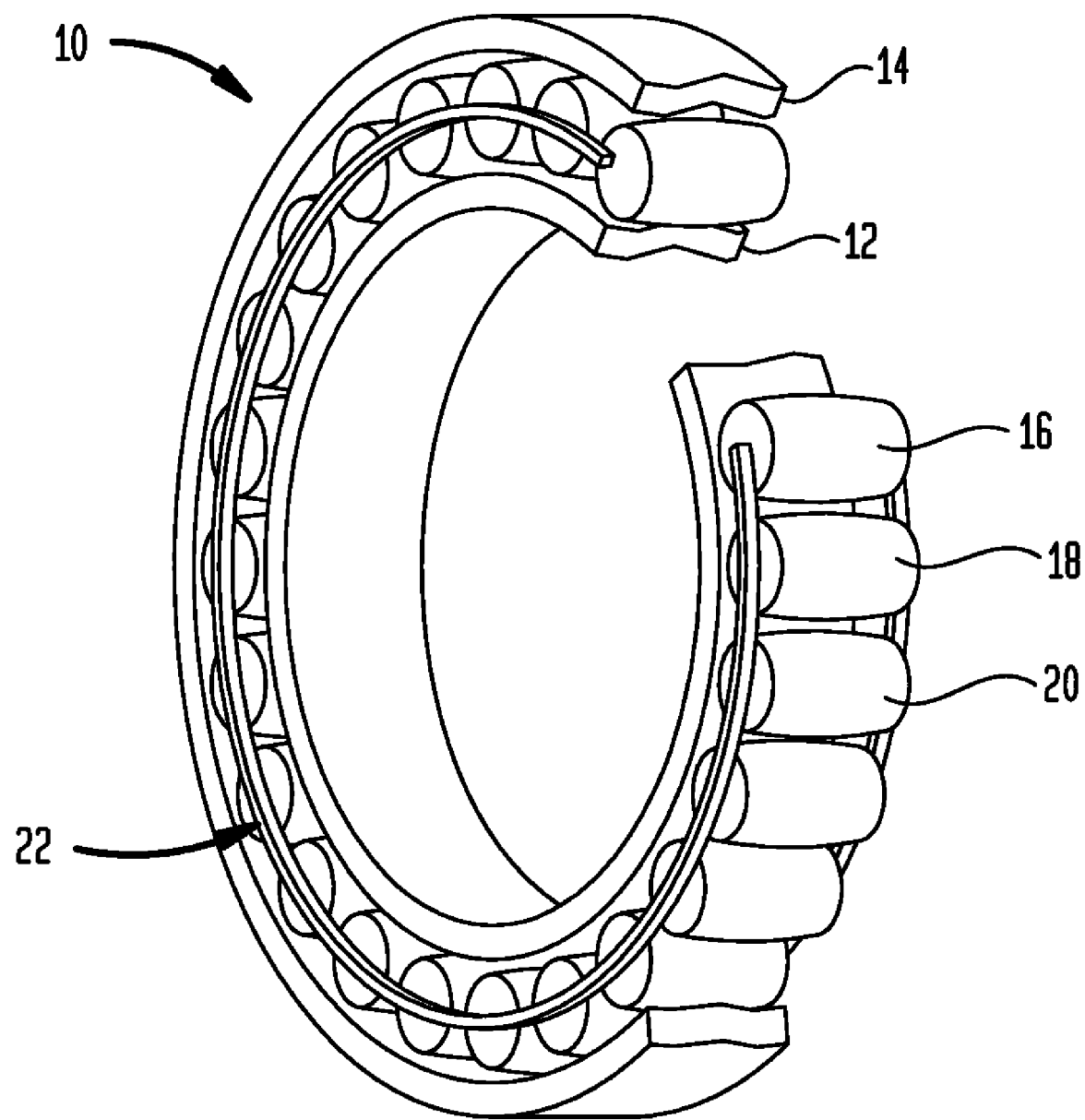
FIG. 1 is a schematic, perspective view of a toroidal roller bearing.

A toroidal roller bearing useful in connection with the present invention is shown schematically in FIG. 1. A roller bearing 10 includes an inner race 12 as well as an outer race 14. In between the races there is provided a plurality of toroidal rollers such as rollers 16, 18, 20 and so forth. Optionally provided is a roller cage assembly indicated schematically at 22.

Toroidal roller bearings such as bearing 10 can accommodate thermal growth in that inner race 12 may be axially displaced with respect to outer race 14 without impairing operation of the bearing. There is shown in FIG. 2 a bearing 10 mounted on a journal or shaft 24 within a housing 26.

Housing 26 is provided with an outside cover 28 as well as an inside cover 30. Bearing 10 is mounted on a shaft, such as a tapered shaft 24, shown schematically in the diagram as well as the housing. Bearing 10 is friction fit onto shaft 24 and secured with a nut 32 as will be discussed in more detail hereinafter. Outside cover 28 and inside cover 30 are affixed to a base member 34 of the housing by way of bolts such as bolts 36 and 38. For purposes of illustration, there is shown in FIG. 2 a relative position wherein inner race 12 is displaced inwardly with respect to outer race 14. This may be the case, for example, when the bearing is mounted in a "cold" state, that is where the equipment has not yet thermally expanded to any substantial degree. In this regard it is seen that inner race 12 is inwardly disposed a distance 40 with respect to outer race 14.

Figure 2:
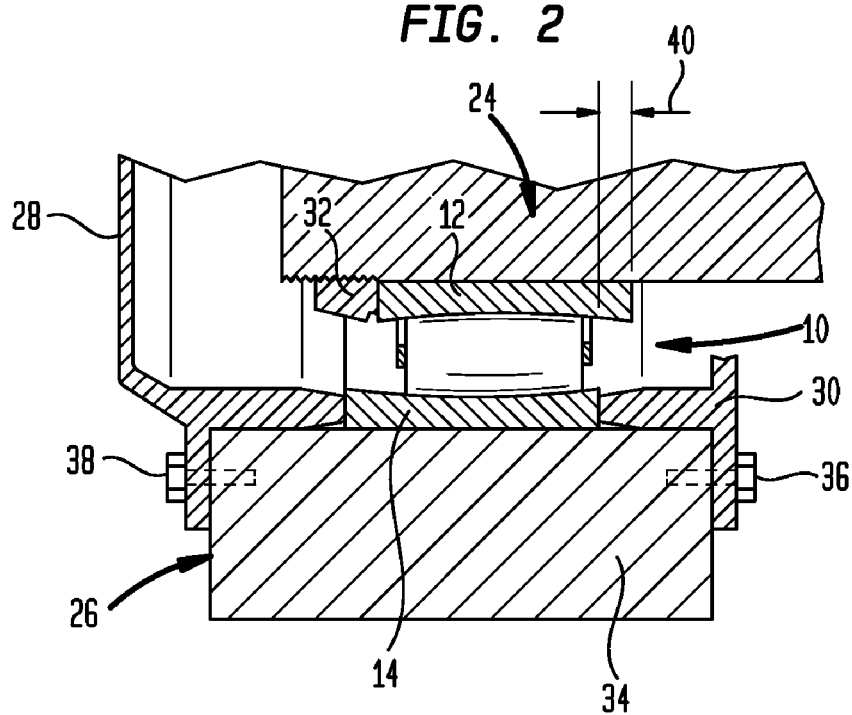
FIG. 2 is a schematic view in section and elevation of a portion of a toroidal roller bearing mounted on a shaft or journal as well as a portion of a bearing housing.
Figure 3:
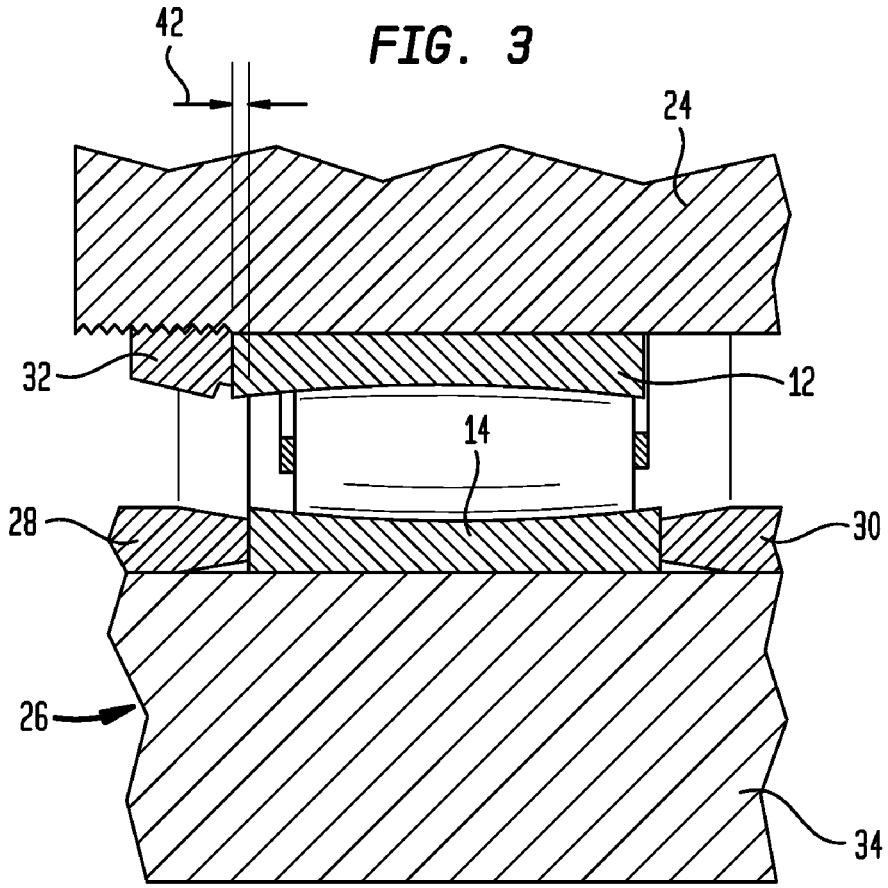
FIG. 3 is a schematic view in elevation and section similar to FIG. 2 wherein a toroidal roller bearing is shown, mounted to a shaft and housing.

FIG. 3 is an illustration similar to FIG. 2, where it is seen that inner race 12 has been displaced outwardly a distance 42 with respect to outer race 14. The relative position shown in FIG. 3 may be, for example, after thermal expansion has occurred and shaft 24 has expanded outwardly as will be appreciated from the relative positions of races 12, 14 shown in FIGS. 2 and 3.

While the bearings can accommodate a modicum of axial displacement and misalignment, it is important that certain tolerances be observed. To this end, the bearing and its housing must be aligned with precision in order to prevent unwanted vibration and failure. The tolerances are quite demanding, for example, one manufacture specifies that total misalignment between the inner and outer races be at most 5°, and preferably less. Prior to the present invention, alignment was achieved manually using straight edges, feeler gauges, dial gauges and so forth, in a very arduous process that would take many hours just to align a single bearing.

It has been found however, that a suitable alignment tool can provide the required precision alignment in a simple manner by aligning the bearing, shaft and housing simply by installing a suitably manufactured bearing alignment tool in the housing which fixes the relative positions of the inner race (mounted on a shaft), the outer race and housing 26.

Figure 4:
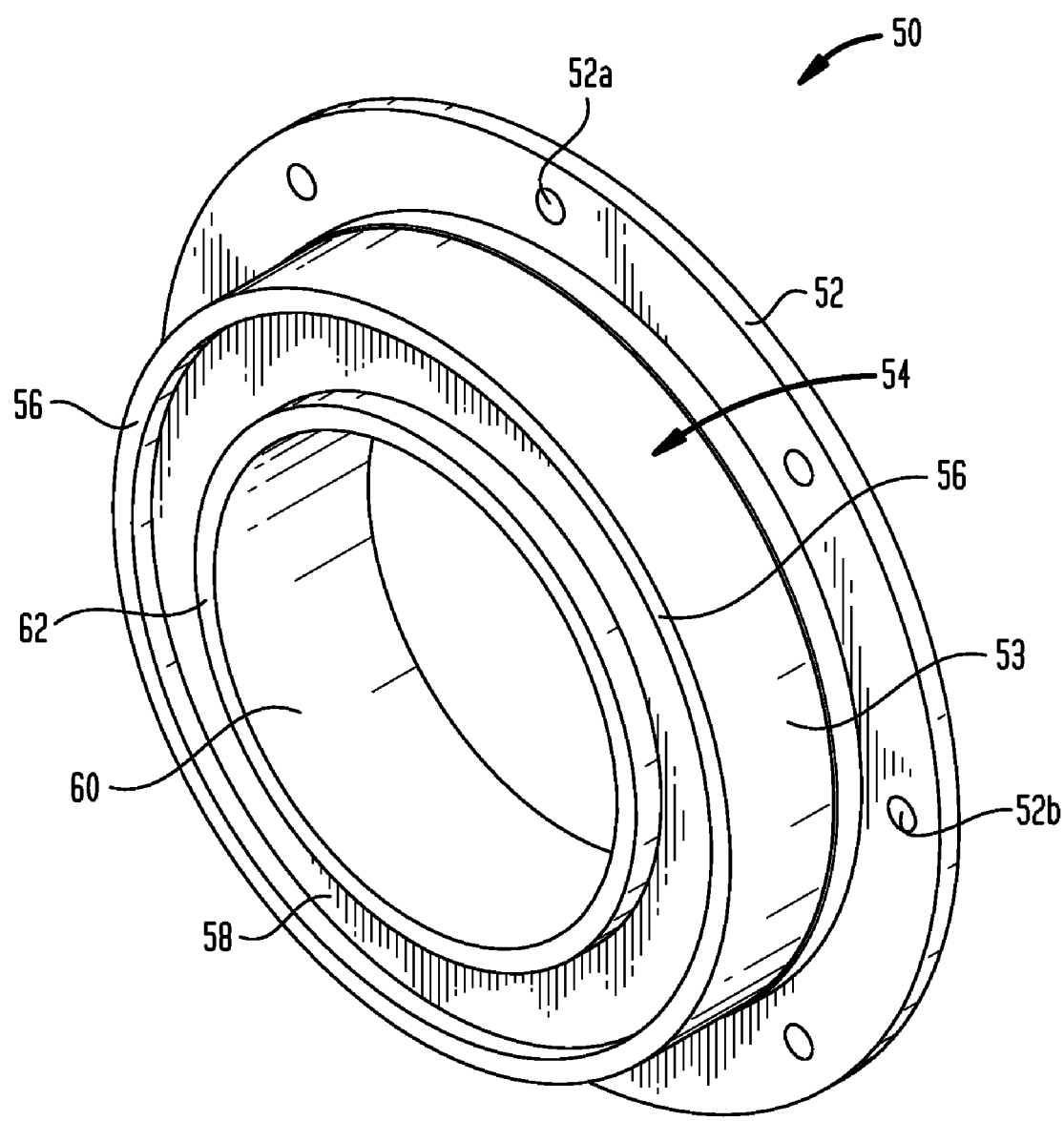
FIG. 4 is a view in perspective of a bearing alignment tool constructed in accordance with the present invention.
Figure 5:
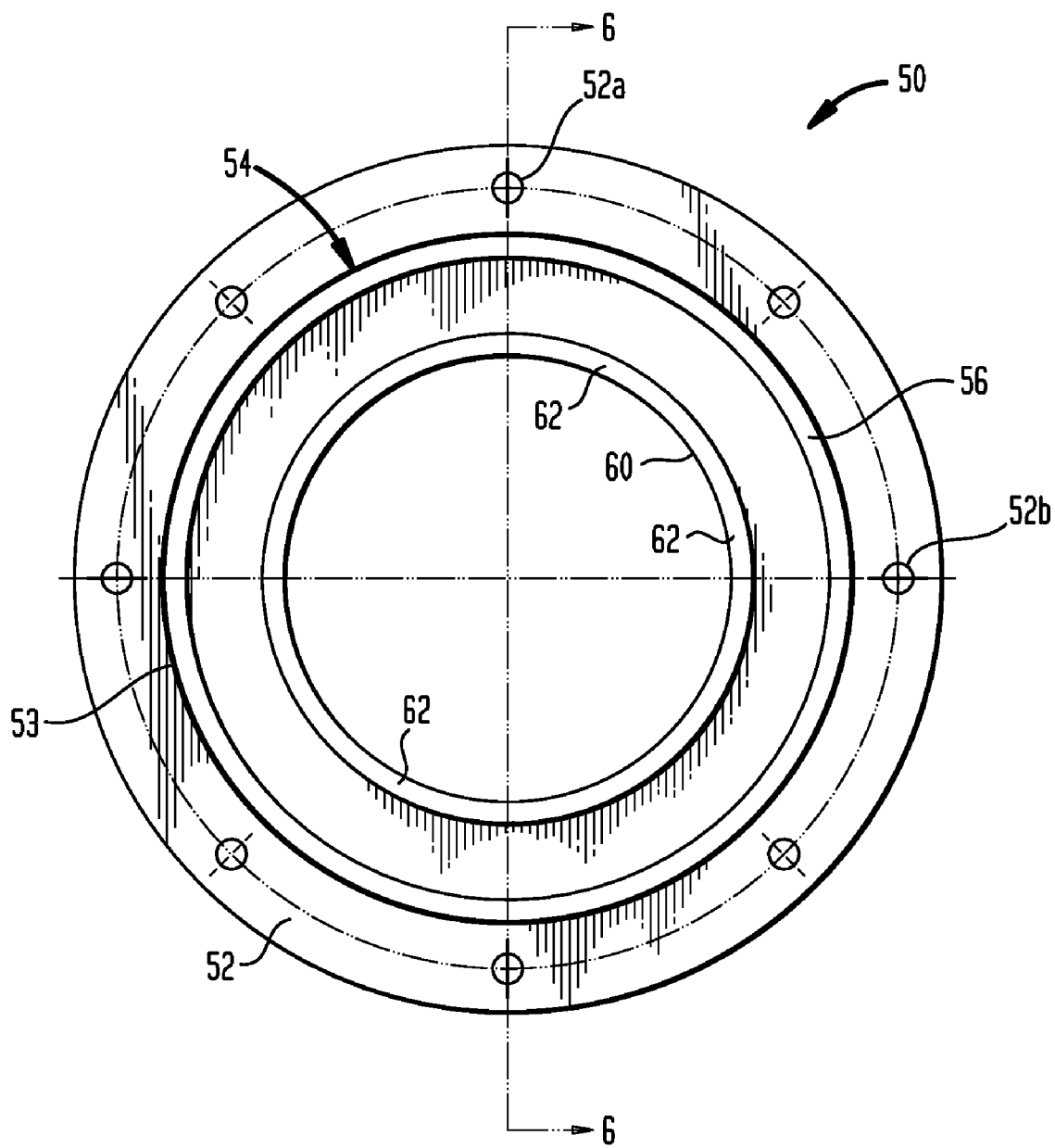
FIG. 5 is a top view of the bearing alignment tool of FIG. 4.
Figure 6:
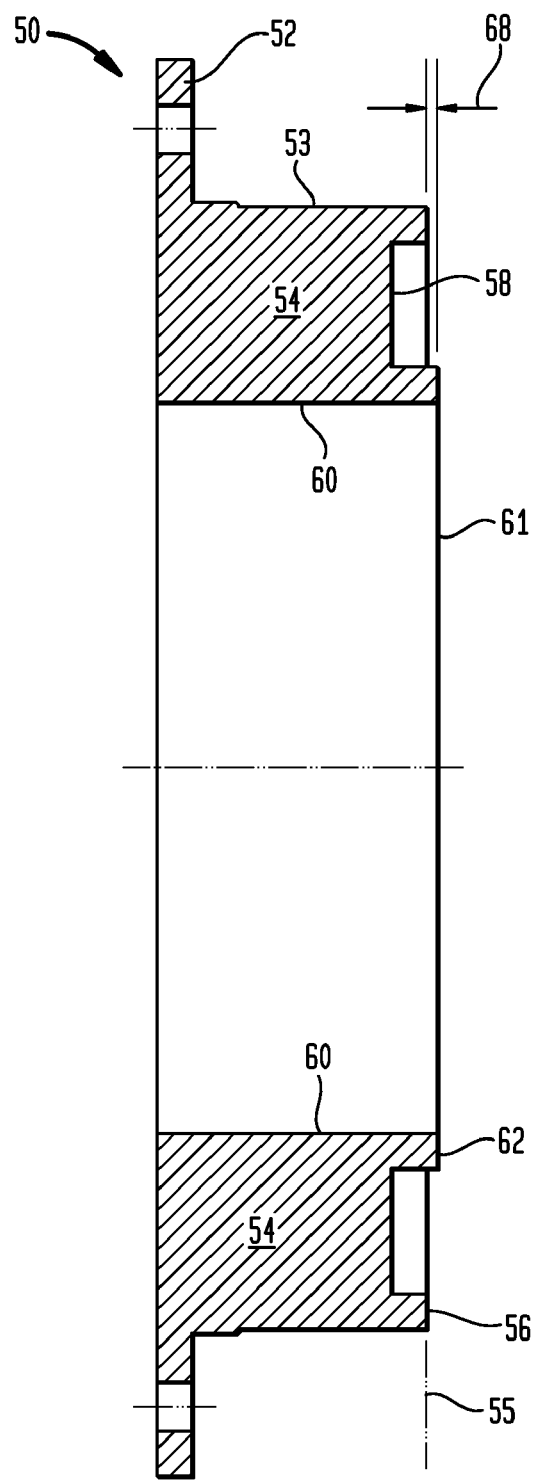
FIG. 6 is a view in section along lines 6-6 of FIG. 5 showing the geometry of the alignment tool.
Figure 7:
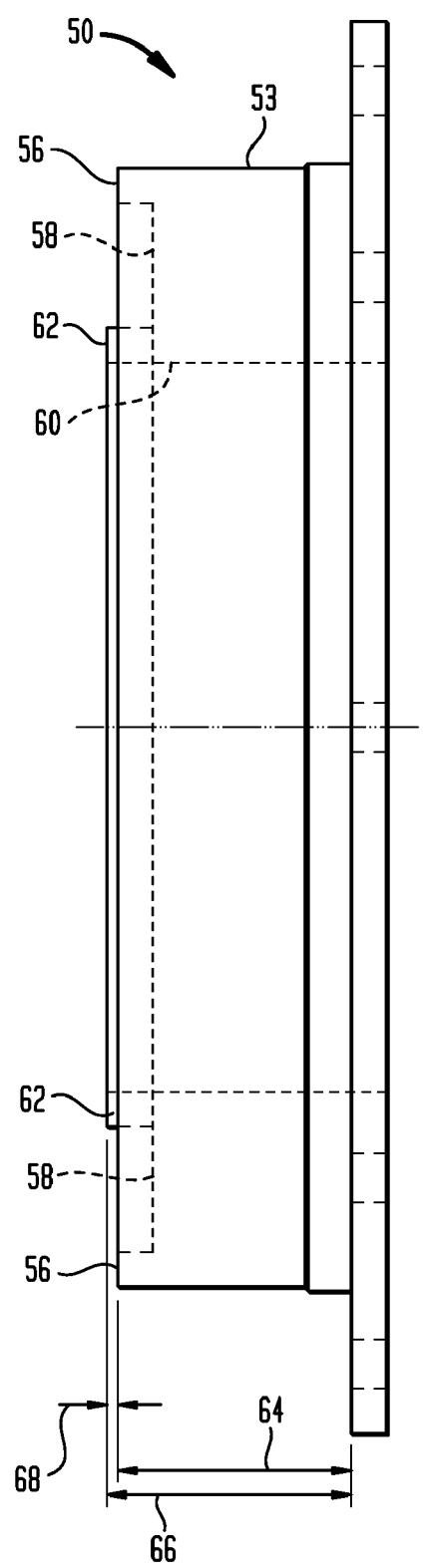
FIG. 7 is a view in elevation illustrating the geometry of the alignment tool.

One such tool is shown in detail in FIGS. 4 through 7. FIG. 4 is a view in perspective of a bearing alignment tool 50. Tool 50 has an outer flange 52 with holes 52a, 52b, and so forth, as well as an inner ring 54. Ring 54 has an outer ring portion 53 which defines a first aligning surface 56, as well as a recess 58. Ring 54 also has an inner ring portion 60. Inner ring portion 60 defines a second alignment surface 62. It will be appreciated from FIG. 7 in particular, that outer ring portion 53 extends a height 64 from flange 52 while inner ring portion 60 extends a height 66 from flange 52 which is larger than height 64 by a delta 68. This delta is the offset applied to the inner and outer races of a roller bearing as will be appreciated from the various diagrams. For present purposes note that surface 56 lies in a plane 55 which is parallel to a plane 61 of surface 62, yet slightly offset axially with respect thereto. As one of skill in the art will appreciate, the alignment surfaces may be distinct annular surfaces which are axially offset as shown, or may be different areas of a single annular surface if coplanar alignment of the races is desired.

Figure 8:
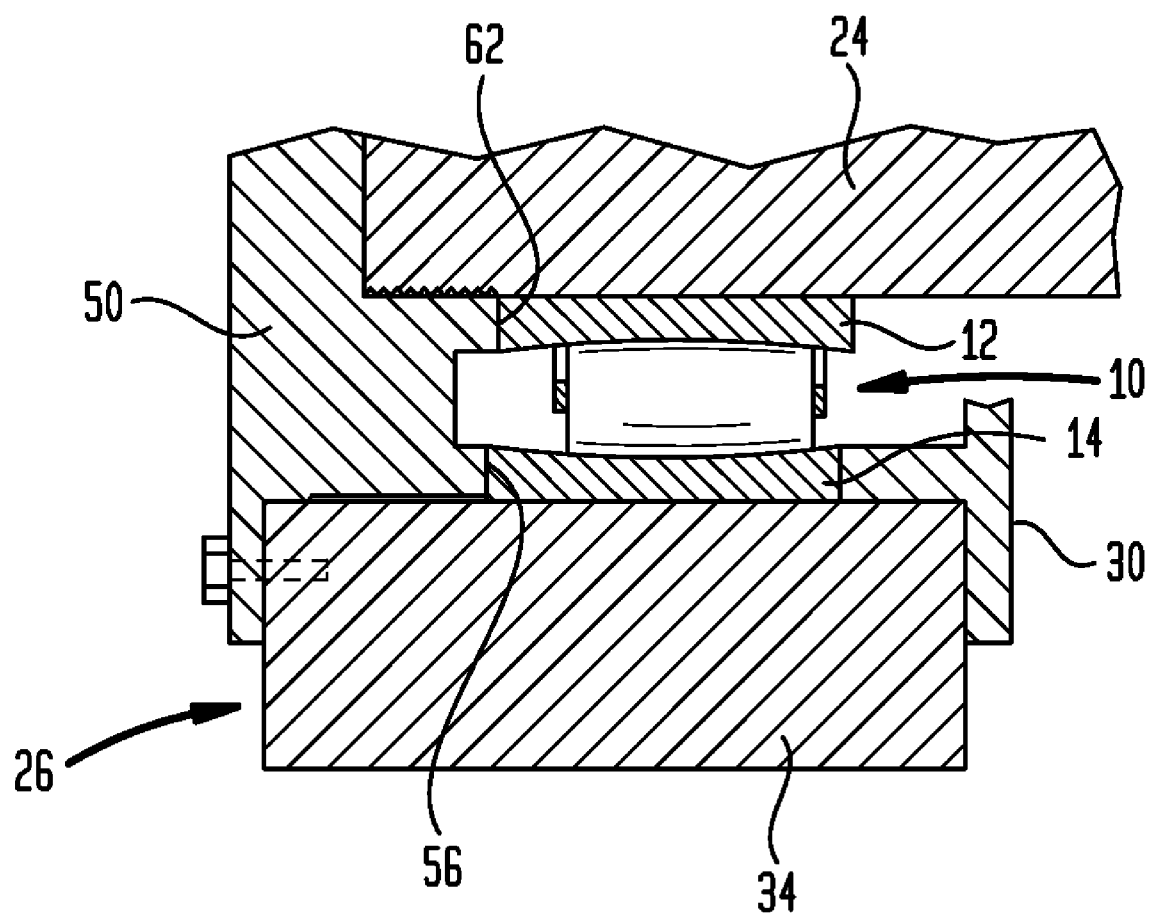
FIG. 8 is an illustration showing a toroidal roller bearing in place on a journal or shaft in a housing with the bearing tool installed.

Turning to FIG. 8, there is shown a bearing such as bearing 10 mounted in a housing 26 with tool 50 installed. Surface 56 engages the outer portion of outer race 14, while aligning surface 62 engages the outer portion of the inner race 12. In this manner, the bearing and housing and shaft are aligned with precision both axially and laterally such that there is essentially no misalignment of the bearing races in a lateral direction and they are slightly offset with respect to an axial direction. Thus, the bearing and housing are aligned and the housing is affixed to a support while the tool is still in place as discussed hereinafter. Alignment of the bearing is efficiently accomplished without the need for manual adjustment after assembly of the various elements.

Figure 9:
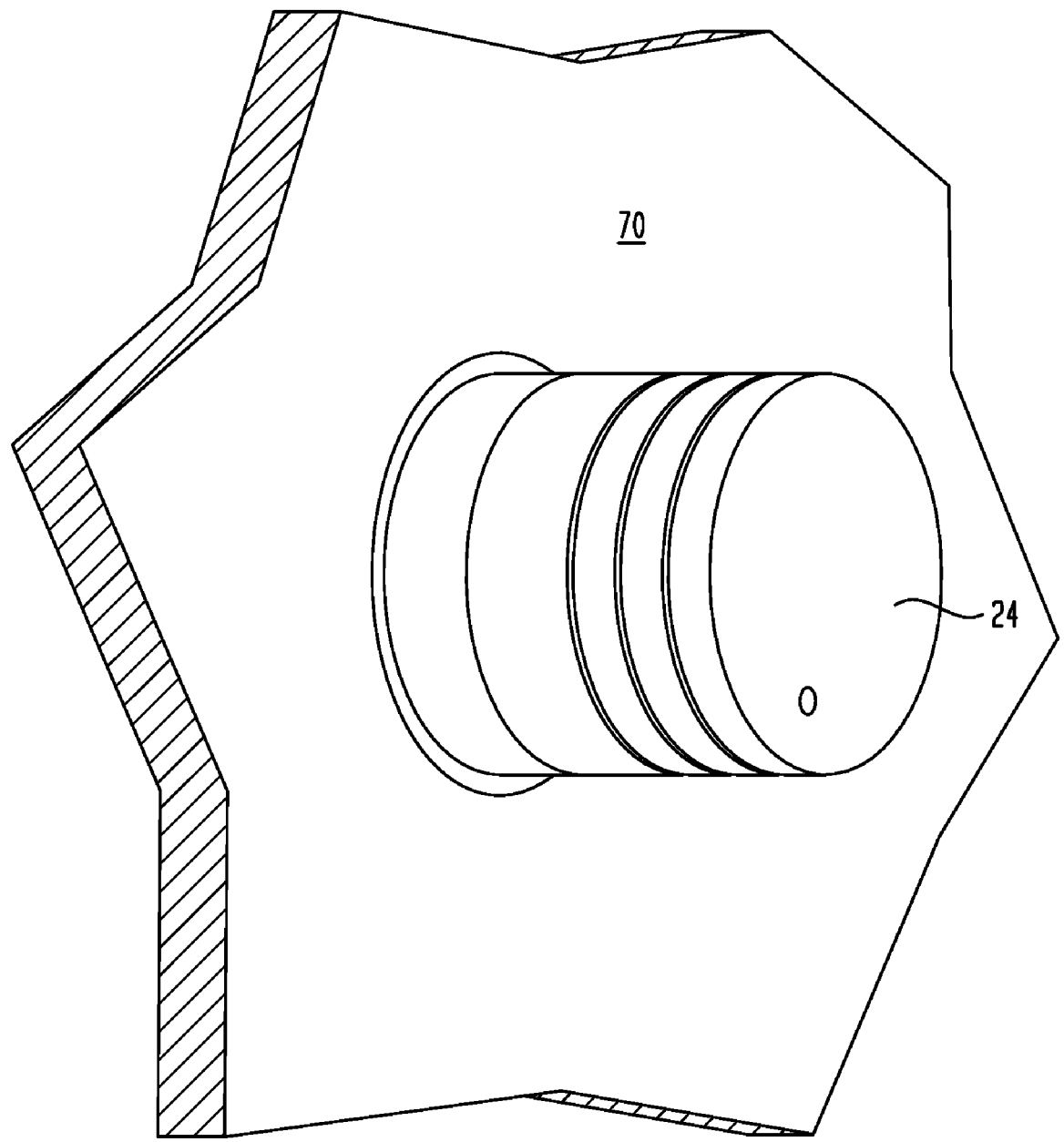
FIG. 9 is a view in perspective of a portion of an afterdryer with a tapered shaft.
Figure 10:
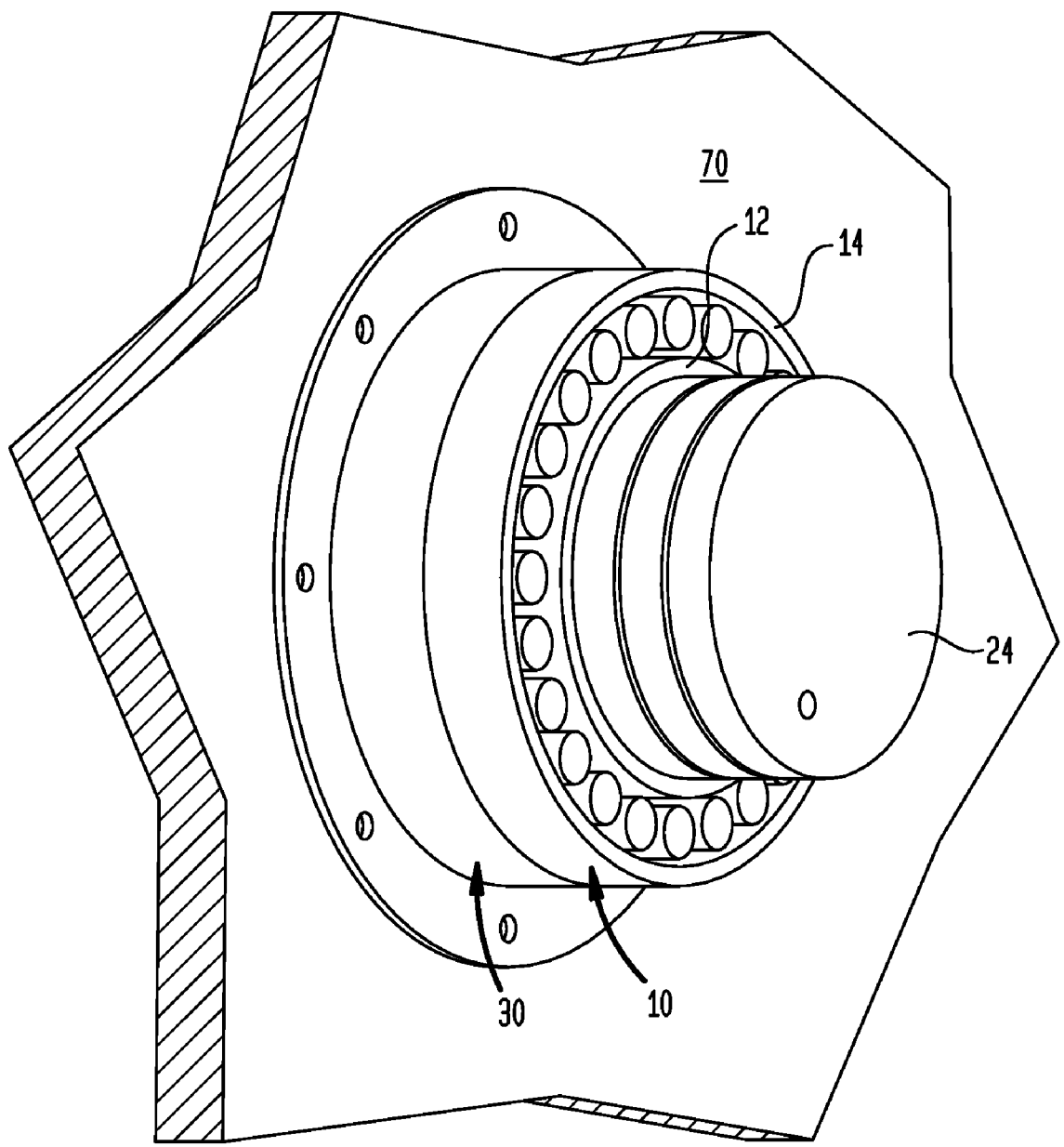
FIG. 10 is a view in perspective of the afterdryer and shaft of FIG. 9 with a toroidal bearing installed on the shaft.
Figure 11:
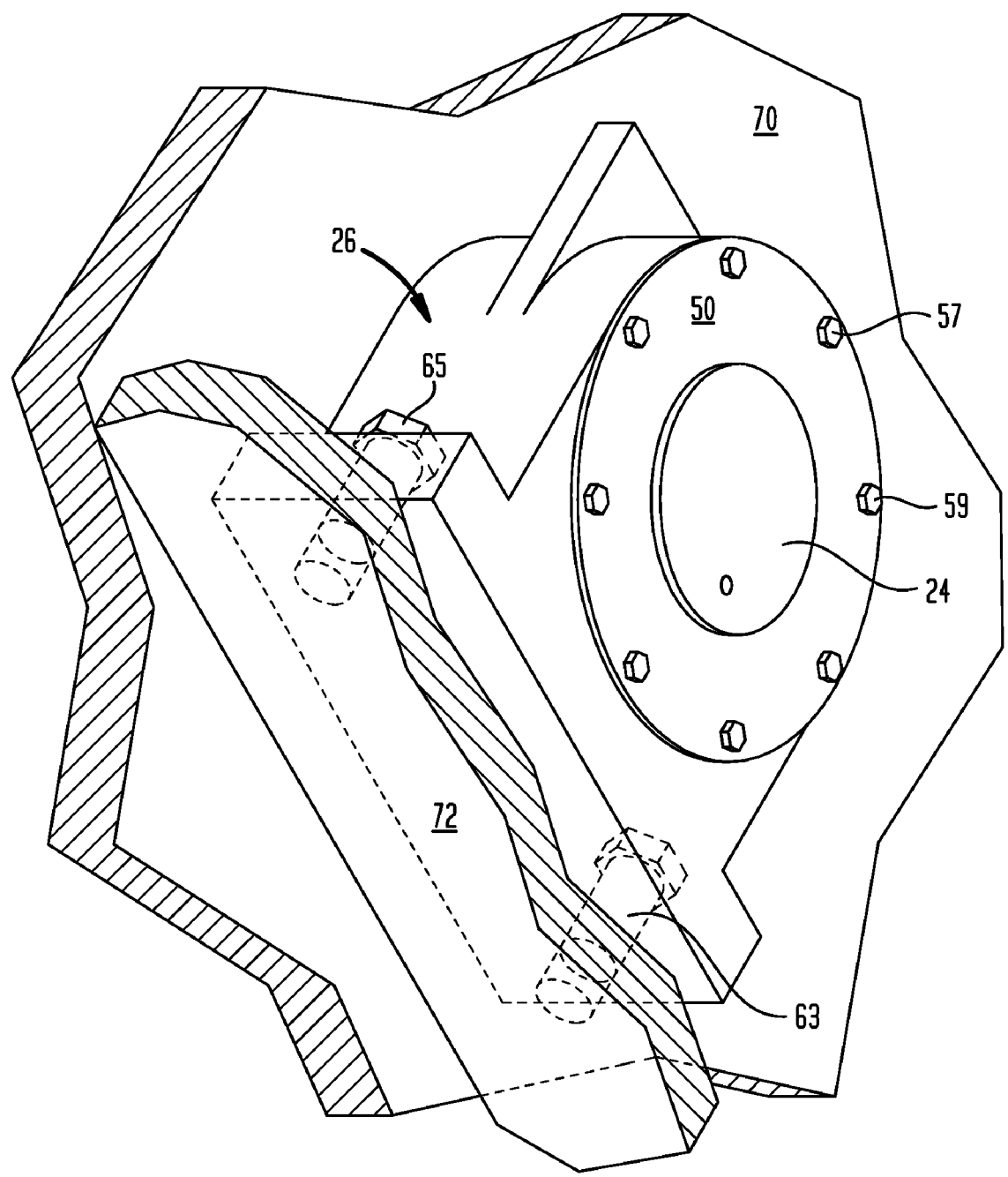
FIG. 11 is a view in perspective of the afterdryer, as well as a bearing and shaft installed in a housing provided with a bearing alignment tool of this invention.

The process by which the bearings are installed is perhaps better understood with further reference to FIGS. 9, 10 and 11.

FIG. 9 is a view in perspective, showing the tapered shaft or journal 24 of an afterdryer 70 without a bearing, that is, after an old bearing has been removed and prior to installing a new bearing. FIG. 10 shows shaft 24 with inside cover 30 and a new roller bearing installed on the shaft. This is accomplished by any suitable technique known in the art. Typically, the roller bearing is installed on the shaft with a hydraulic nut, since the bearing is of engineered dimensions, and shaft 24 is a tapered shaft as will be appreciated from FIG. 9. The radial clearance of the bearing will decrease as the bearing is friction fit and tightened onto tapered shaft 24. A typical means is to apply the bearing with a hydraulic nut and to measure the position with a dial gauge to ensure proper installation and radial clearance.

After the bearing and inside cover 30 are installed on the shaft, housing 26 and alignment tool 50 are applied over the shaft as shown in FIG. 11 and tool 50 is bolted in place as shown with bolts 57, 59 and so forth. At this point, the alignment tool is tightened fixing the axial and lateral alignment of bearing 10 and shaft 24 as well as housing 26. Thus, the various components are fixed with respect to axial and lateral alignment by surfaces 56 and 62. Housing 26 is then bolted into place on a support 72 with bolts 63, 65 (and more if so desired) with the alignment tool maintaining the relative positions of bearing races 12, 14 and housing 26. That is to say, the housing is fixed in position prior to removing tool 50 such that surfaces 62 and 56 position inner race 12 and outer race 14 respectively of the bearing with respect to each other and the housing.

It is only after the housing is bolted into place, that tool 50 is removed. The friction caused by the bearing installation process, forcing a tapered bearing onto a tapered journal, maintains the bearing in place and a lock washer and lock nut are installed.

In operation, shaft 24 expands thermally such that inner race 12 will be translated outwardly. However, outer race 14 will be held in place by outside cover 28 and inside cover 30 as inner race 12 "floats" to accommodate thermal expansion. Typically, the thermal expansion will involve a distance of less than 100 mils or so and this distance is taken into account in determining the delta 68 between the plane of surface 62 and surface 56.

While the invention has been described in detail, modifications within the spirit and scope of the invention will be readily apparent to those of skill in the art. In view of the foregoing discussion as well as relevant knowledge in the art, further description is deemed unnecessary.

What is claimed is:

1. A bearing alignment tool for aligning inner and outer races of a roller bearing of the class wherein inner and outer races of the roller bearing are axially displaceable to accommodate axial thermal growth of a rotating shaft, the roller bearing being mounted to the shaft at its inner race and mounted to a housing at its outer race the alignment tool comprising:

(a) a mounting portion for affixing the alignment tool to the housing;

(b) an outer aligning surface for engaging the outer race of the roller bearing; and (c) an inner aligning surface for engaging the inner race of the roller bearing, wherein the tool is dimensioned such that the aligning surfaces position the inner and outer roller bearing races in a predetermined spatial relationship with respect to each other and the housing when the tool is secured to the housing.

2. The bearing alignment tool according to claim 1, wherein the outer and inner aligning surfaces reside in substantially parallel planes with respect to each other or are substantially coplanar.

3. The bearing alignment tool according to claim 1, wherein the inner and outer aligning surfaces are disposed in substantially parallel planes which are axially offset with respect to each other.

4. The bearing alignment tool according to claim 1, wherein the inner aligning surface is disposed axially inwardly with respect to the outer aligning surface.

5. The bearing alignment tool according to claim 1, wherein the inner aligning surface is a substantially planar, annular surface.

6. The bearing alignment tool according to claim 1, wherein the outer aligning surface is a substantially planar, annular surface.

7. The bearing alignment tool according to claim 1, wherein the mounting portion of the tool is a flange.

8. The bearing alignment tool according to claim 1, further comprising a recess between the inner aligning surface and the outer aligning surface.

9. The bearing alignment tool according to claim 1, having a monolithic construction.

10. A bearing alignment tool for aligning inner and outer races of a roller bearing of the class wherein the inner and outer races of the roller bearing are axially displaceable to accommodate axial thermal growth of a rotating shaft, the roller bearing being mounted to the shaft at its inner race and mounted to a housing at its outer race, the alignment tool comprising:
  (a) a mounting flange for affixing the bearing alignment tool to the housing;
  (b) an outer, substantially planar annular alignment surface for engaging the outer race of the roller bearing; and
  (c) an inner, substantially planar annular alignment surface for engaging the inner race of the roller bearing, the inner alignment surface residing in a substantially parallel plane with respect to the outer alignment surface or being substantially coplanar therewith, wherein the tool is dimensioned such that the aligning surfaces position the inner and outer bearing races of the roller bearing in a predetermined spatial relationship with respect to each other and the housing when the tool is secured to the housing.

11. The bearing alignment tool according to claim 10, wherein the inner and outer aligning surfaces are disposed in substantially parallel planes which are axially offset with respect to each other.

12. The bearing alignment tool according to claim 11, wherein the inner aligning surface is disposed axially inwardly with respect to the outer aligning surface.

13. The bearing alignment tool according to claim 10, wherein the mounting portion of the tool is a flange.

14. The bearing alignment tool according to claim 10, further comprising a recess between the inner aligning surface and the outer aligning surface.

15. A method of aligning inner and outer races of a roller bearing of the class wherein the inner and outer races of the roller bearing are axially displaceable to accommodate thermal growth of a rotating shaft comprising:
  (a) affixing the roller bearing to the shaft at its inner race;
  (b) disposing the shaft in a housing;
  (c) aligning the inner and outer races of the roller bearing with respect to each other and the housing in a predetermined spatial relationship by affixing an alignment tool to the housing, wherein the alignment tool includes (i) an outer aligning surface which engages the outer race of the roller bearing; and (ii) an inner aligning surface which engages the inner race of the roller bearing;
  (d) removing the alignment tool from the housing;
  (e) securing the housing to a fixed position on a support while maintaining the predetermined spatial relationship established in step (c).

16. The method according to claim 15, wherein the roller bearing is a toroidal roller bearing.

17. The method according to claim 15, wherein the shaft is a tapered shaft.

18. The method according to claim 15, wherein the inner race of the roller bearing is inwardly offset from the outer race of the roller bearing by a distance of from 10 mils to 250 mils.

19. The method according to claim 15, wherein the total misalignment between the inner and outer races of the installed bearing is less than 5°.

20. The method according to claim 15, wherein the shaft is attached to a rotating drum afterdryer of a papermachine.

* * * * *